(12) United States Patent
Walz et al.

(10) Patent No.: US 8,024,921 B2
(45) Date of Patent: Sep. 27, 2011

(54) METHOD FOR OPERATING AN INTERNAL COMBUSTION ENGINE AND DEVICE FOR CARRYING OUT THE METHOD

(75) Inventors: Christian Walz, Durmersheim (DE);
Matthias Loehr, Steinheim/Hoepfigheim (DE); Andreas Rudolph, Roggenburg (DE)

(73) Assignee: Robert Bosch GmbH, Stuttgart (DE)

( * ) Notice: Subject to any disclaimer, the term of this patent is extended or adjusted under 35 U.S.C. 154(b) by 614 days.

(21) Appl. No.: 12/066,223

(22) PCT Filed: Jul. 31, 2006

(86) PCT No.: PCT/EP2006/064854
§ 371 (c)(1),
(2), (4) Date: Nov. 21, 2008

(87) PCT Pub. No.: WO2007/028677
PCT Pub. Date: Mar. 15, 2007

(65) Prior Publication Data
US 2009/0199541 A1    Aug. 13, 2009

(30) Foreign Application Priority Data
Sep. 7, 2005   (DE) .......................... 10 2005 042 489

(51) Int. Cl.
*F01N 3/00* (2006.01)
*F01N 3/10* (2006.01)
(52) U.S. Cl. ................. 60/286; 60/276; 60/299; 60/301
(58) Field of Classification Search ...................... 60/286
See application file for complete search history.

(56) References Cited

U.S. PATENT DOCUMENTS

| | | | |
|---|---|---|---|
| 4,302,205 A | 11/1981 | Muraki et al. | |
| 4,473,536 A | 9/1984 | Carberg et al. | |
| 5,643,536 A * | 7/1997 | Schmelz | 422/105 |
| 5,849,593 A * | 12/1998 | Schmelz | 436/55 |
| 2001/0032457 A1* | 10/2001 | Ludwig et al. | 60/285 |
| 2002/0124555 A1* | 9/2002 | Bidner et al. | 60/285 |
| 2004/0187482 A1* | 9/2004 | Bidner et al. | 60/285 |

FOREIGN PATENT DOCUMENTS

| | | |
|---|---|---|
| DE | 37 21 572 | 2/1988 |
| DE | 199 03 439 | 8/2000 |
| DE | 199 60 731 | 6/2001 |
| DE | 199 62 912 | 7/2001 |
| DE | 10 2004 031 624 | 2/2006 |
| DE | 10 2004 046 640 | 3/2006 |
| EP | 1 434 049 | 6/2004 |

* cited by examiner

*Primary Examiner* — Thomas Denion
*Assistant Examiner* — Jason Shanske
(74) *Attorney, Agent, or Firm* — Merchant & Gould P.C.

(57) ABSTRACT

A method for operating an internal combustion engine in whose exhaust gas region at least one SCR catalytic converter is arranged, a reagent which contributes to NOx conversion in the SCR catalytic converter being applied to said SCR catalytic converter, and a device for carrying out the method are proposed. A measure for the NOx current which occurs downstream of the SCR catalytic converter is both calculated and measured with an NOx sensor which has lateral sensitivity to the reagent. The difference between the calculated measure and the measured measure of the NOx current is determined. A reagent signal which defines the metering of the reagent is influenced as a function of the difference. Plausibility checking is provided, during which the reagent quantity which is metered in a predefined time period and the reagent quantity which is converted in the SCR catalytic converter and/or the converted NOx quantity are compared with one another. When a deviation is detected, a correction signal which also influences the reagent signal is made available.

10 Claims, 1 Drawing Sheet

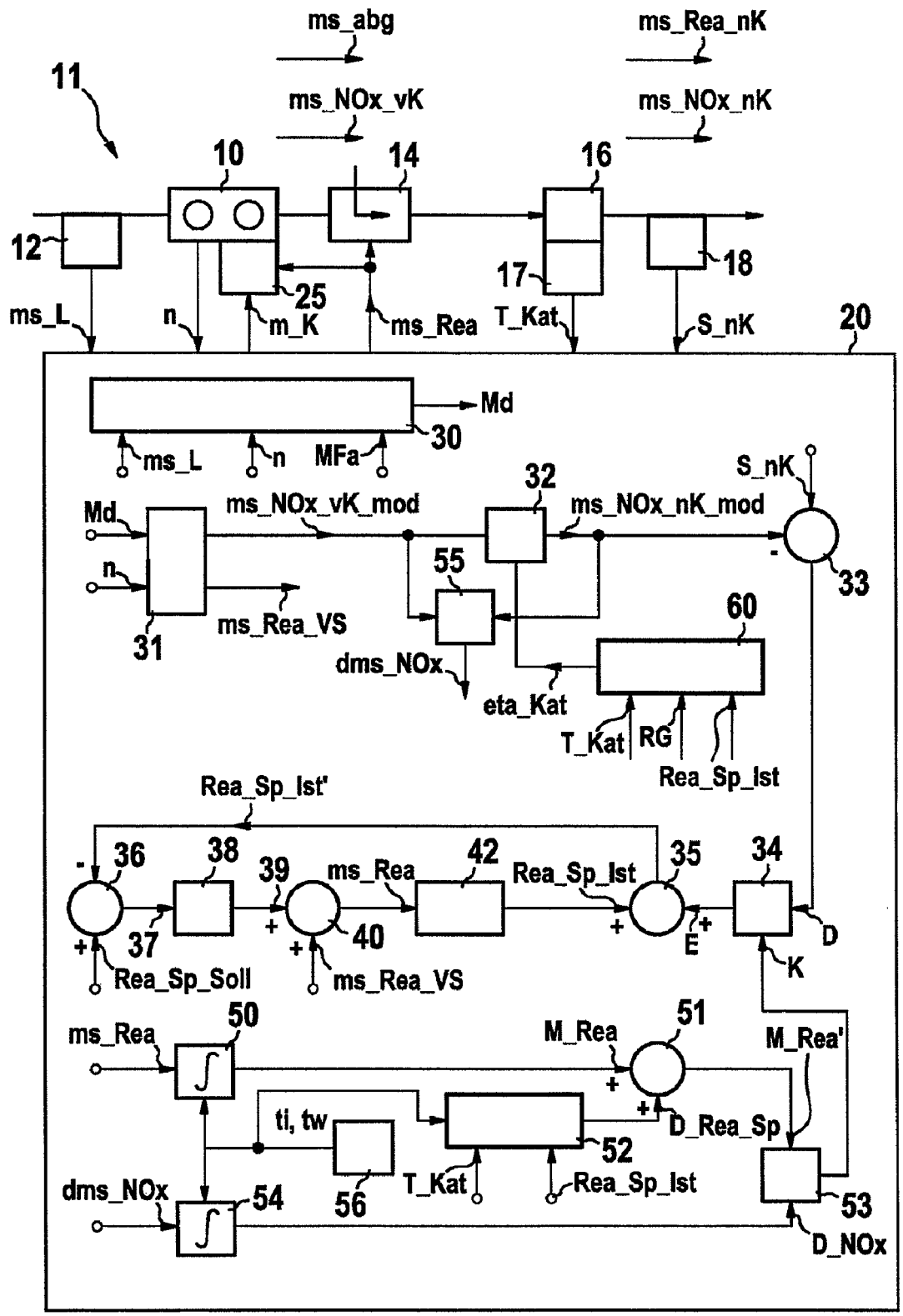

METHOD FOR OPERATING AN INTERNAL COMBUSTION ENGINE AND DEVICE FOR CARRYING OUT THE METHOD

TECHNICAL FIELD

The invention proceeds from a procedure to operate an internal combustion engine, in whose exhaust gas region, a NOx sensor, which has lateral sensitivity to the reagent substance, which contributes to the NOx conversion in the SCR catalytic converter, is disposed downstream after the SCR catalytic converter; and from a device to implement the procedure according to the class of the independent claims.

BACKGROUND

In the German patent DE 199 03 439 A1 a procedure and a device to operate an internal combustion engine are described, in whose exhaust gas region a SCR catalytic converter (Selective Catalytic Reduction) is disposed, which reduces the nitrogen oxides contained in the exhaust gas of the internal combustion engine to nitrogen using a reagent substance. The metering of the reagent substance is carried out preferably as a function of the operating parameters of the internal combustion engine, such as, for example, the engine rotational speed and the amount of fuel injected. Furthermore, the metering is carried out preferably as a function of the exhaust gas parameters, such as, for example, the exhaust gas temperature or the operating temperature of the SCR catalytic converter.

Provision is made, for example, for ammonia to be the reducing agent, which can be derived from a urea water solution. The dosage of the reagent substance or of the source materials of the reagent substance must be carefully established. A dosage which is too small has the consequence that the nitrogen oxides in the SCR catalytic converter can no longer be completely reduced. Too large of a dosage leads to a slip of the reagent substance, which on the one hand can lead to an unnecessarily large consumption of the reagent substance, and on the other hand as a function of the composition of the reagent substance can lead to an unpleasant odor.

In the German patents DE 199 60 731 A1 and DE 199 62 912 A1, NOx sensors are described in each case, in which provision is made for the acquisition of the NOx concentration present in an exhaust gas current. The NOx sensors contain multiple chambers, which are connected to each other via diffusion barriers. The known multiple chamber NOx sensors have as a result of the measuring principle a lateral sensitivity to ammonia (NH3). For example as a reagent substance, the ammonia contained in the exhaust gas leads to a falsification of the sensor signal by way of the reactions 4 $NH3+5\ O2 \rightarrow 4\ NO+6\ H2O$. If an increase of the reagent substance dosage thus occurs during the previously known procedural approaches, the sensor signal will increase when an excess dosage or a correct dosage of the reagent substance exists due to the reagent substance slip which arises; and when an underdosage of the reagent substance exists due to the increasing NOx conversion, the sensor signal will drop out. If on the other hand the reagent substance dosage is lowered, the sensor signal will drop out if an excess dosage of the reagent substance exists due to the decreased reagent substance slip; and the sensor signal will increase when a correct dosage or an underdosage of the reagent substance exists due to the NOx conversion, which is no longer complete.

In the German patent DE 10 2004 046 640 A1, a procedure to operate and internal combustion engine and a device to implement the procedure are described, in which a NOx sensor with a lateral sensitivity to a reagent substance is disposed downstream after the SCR catalytic converter. At least one SCR catalytic converter, which is impinged with a reagent substance, is disposed in the exhaust gas region. The reagent substance contributes to the NOx conversion in the SCR catalytic converter. Provision is made for the calculation of at least one measure for the NOx concentration arising downstream after the SCR catalytic converter. This calculation makes an increase in accuracy when establishing a dosage of the reagent substance possible. A reagent substance slip can be ascertained from the difference between the calculated measure for the NOx concentration and the measured measure for the sum of the NOx concentration and the reagent substance concentration. The fact is taken into account that a reagent substance slip as well as an insufficient NOx reducing reaction causes a deviation in the same direction between the calculated measure for the NOx concentration and the measured measure for the sum of the NOx concentration and the reagent substance concentration. According to one embodiment the dosage of the reagent substance is initially reduced when a difference as mentioned above occurs. If a reagent substance slip were present, the reduction of the dosage of the reagent substance would lead to a reduction of the reagent substance slip. The reduction of the dosage of the reagent substance proved in this case to be the correct step. If too small a dosage of the reagent substance were originally present, the difference ascertained would continue to increase due to a small NOx conversion, so that it could be suggested from this, that the reduction of the reagent substance was false and an increase of the dosage is to be conducted instead.

In the German patent DE 10 2004 031 624 A1, a procedure is described to operate a SCR catalytic converter used to purify the exhaust gas of an internal combustion engine, in which provision is made for an open-loop or closed-loop adjustment of the reagent substance fill level in the SCR catalytic converter to a specified storage set point. The targeted specification of the storage set point secures on the one hand that during transient states of the internal combustion engine, a sufficient amount of the reagent substance is available to remove the NOx emissions of the internal combustion engine before the SCR catalytic converter as completely as possible; and that on the other hand, a reagent substance slip is avoided.

The reagent substance fill level of the SCR catalytic converter is ascertained using a catalytic converter model, which takes into account the NOx mass flow entering into the SCR catalytic converter, the NOx mass flow departing the SCR catalytic converter, the temperature of the catalytic converter as well as if need be the reagent substance slip. The maximum possible reagent substance fill level of the SCR catalytic converter depends especially on the operating temperature of the SCR catalytic converter, which is the highest at low operating temperatures and drops off to lower values with an increasing operating temperature. The efficiency of the SCR catalytic converter depends on the catalytic activity; which is small at low operating temperatures, passes through a maximum with a rising operating temperature and drops off again when the operating temperature continues to rise.

The task underlying the invention is to indicate a procedure to operate an internal combustion engine, in whose exhaust gas region a SCR catalytic converter and a NOx sensor located downstream after the SCR catalytic converter are disposed, as well as a device to implement the procedure, which allows for the most optimal as possible result for the purification of the exhaust gas simultaneously with a minimal reagent substance slip.

The task is solved in each case by the characteristics indicated in the independent claims.

SUMMARY OF THE INVENTION

The procedure according to the invention to operate an internal combustion engine assumes that at least one SCR catalytic converter is disposed in the exhaust gas region of the internal combustion engine. The SCR catalytic converter is impinged with a reagent substance, which contributes to the NOx conversion in the SCR catalytic converter. Downstream after the catalytic converter, a NOx sensor is disposed, which provides a sensor signal, which reflects at least a measure for the NOx current in the exhaust gas downstream after the catalytic converter, and as a result of a lateral sensibility to the reagent substance reflects a measure for the reagent substance slip. At least one measure is additionally calculated for the NOx current arising downstream after the SCR catalytic converter. The difference is ascertained between the calculated measure for the NOx current and the measured NOx current. A reagent substance signal, which establishes the dosage of the reagent substance, is influenced as a function of the ascertained difference. Provision is made for a plausibility check, during which the reagent substance quantity, which is metered in a predefined time period, and the reagent substance quantity, which is converted in the SCR catalytic converter, and/or the converted NOx quantity are compared with one another. When a deviation is detected, a correction signal which also influences the reagent signal is made available.

Due to the lateral sensibility of the NOx sensor to the reagent substance, a decision cannot be made offhand when a detected difference occurs, if an overdosage of the reagent substance exists, which leads to a reagent substance slip; or if an underdosage of the reagent substance exists, which gives occasion to an increased NOx current. With the plausibility check, the procedural approach according to the invention makes possible if necessary a required correction of the dosage of the reagent substance in the case that initially a correction was conducted in the wrong direction. A change in the dosage of the reagent substance in the right direction is confirmed by the plausibility check, whereby in this case no further intervention is required.

An important advantage of the procedural approach according to the invention results from a reduced administrational outlay. The procedural approach according to the invention particularly achieves a metering of the reagent substance, which has only a slight overshooting and undershooting of the desired quantity. An optimal metering of the reagent substance is thereby achieved; so that on the one hand a minimal reagent substance slip can be assured, and on the other hand a large NOx conversion can be assured.

The procedural approach according to the invention can thus be implemented with simple and cost effective means so that merely a NOx sensor disposed downstream after the SCR catalytic converter is required, which has an inherently undesirable lateral sensitivity to the reagent substance. This lateral sensitivity is specifically utilized in the procedural approach according to the invention.

Advantageous modifications and embodiments of the procedural approach according to the invention result from the dependent claims.

Provision is made in one embodiment for the change in the reagent substance actual fill level in the SCR catalytic converter to continue to be taken into account during the predefined time period in the plausibility check. A high degree of accuracy is thereby achieved; in that during the acquisition of the change in the reagent substance actual fill level, the temperature of the SCR catalytic converter is taken into account.

Taking the change in the reagent substance actual fill level into account supports the plausibility check, because the reagent substance quantity, which becomes deposited in the SCR catalytic converter at least within the predefined time period, or the reagent substance quantity extracted from the SCR catalytic converter can be taken into account during the balancing of the converted reagent substance quantity and/or the converted NOx quantity and the metered reagent substance quantity.

Provision is made in one embodiment for the reagent substance quantity to be standardized to that quantity metered in the predefined time period when the correction signal is being acquired. With this step the balancing becomes independent of the metered reagent substance quantity.

Provision is made in one embodiment for the reagent substance signal to be established as a function of the reagent substance fill level in the SCR catalytic converter. Provision is made in a modification of this embodiment for the reagent substance signal to be indirectly affected by way of a manipulation of the reagent substance fill level in the SCR catalytic converter. Preferably the reagent substance fill level in the SCR catalytic converter is regulated in a closed-loop to a specified reagent substance set point fill stand.

Provision is made in one embodiment for a plausibility check to be conducted only after the termination of a specific waiting period after the reagent substance signal has been influenced by the correction signal. This step assures that at least a quasi-stationary operating state, in which a plausibility check can be meaningfully implemented, is again achieved after a correction, which is required as the case may be.

The device according to the invention to operate an internal combustion engine concerns initially a control unit, which is designed to implement the procedure. The control unit especially contains a first integrator to acquire the metered reagent substance quantity and a second integrator to acquire the reagent substance amount converted in the SCR catalytic converter and/or the converted NOx quantity as well as a correction signal ascertainment, which provides the correction signal.

The control unit preferably contains an electrical storage memory, in which the procedural steps are filed as a computer program.

Additional advantageous modifications and embodiments of the procedural approach according to the invention result from additional dependent claims and from the following description.

BRIEF DESCRIPTION OF THE DRAWING

The FIGURE shows a technical environment, in which the procedure according to the invention is operating.

DETAILED DESCRIPTION

The FIGURE shows an internal combustion engine 10, in whose air intake section 11, an air ascertainment 12 is disposed; and in whose exhaust gas region 13, a reagent substance metering 14, a SCR catalytic converter 16, a temperature sensor 17 assigned to the SCR catalytic converter 16 as well as a NOx sensor 18, which is disposed downstream after the SCR catalytic converter 16, are disposed.

An exhaust gas current ms_abg as well as an untreated NOx current before the SCR catalytic converter ms_NOx_vK arises downstream after the internal combustion engine 10. A NOx current ms_NOx_nK as well as a reagent substance slip ms_Rea_nK arises downstream after the SCR catalytic converter 16.

The air ascertainment 12 provides an air signal ms_L to a control unit 20; the internal combustion engine 10 provides an engine rotational speed signal n; the temperature sensor 17 provides a measure for the temperature te_Kat of the SCR catalytic converter 16; and the NOx sensor 18 makes an exhaust gas sensor signal S_nK available to the control unit 20.

The control unit 20 provides a fuel signal m_K to a fuel metering device 25 assigned to the internal combustion engine 10 as well as a reagent substance signal ms_Rea to the reagent substance metering 14 and to the fuel metering device 25.

The control unit 20 contains a torque ascertainment 30, which is provided with the air signal ms_L, the engine rotational speed signal n as well as a torque set point MFa and which ascertains a torque Md of the internal combustion engine 10.

The control unit 20 additionally contains an untreated NOx current ascertainment 31, which is provided with the air signal ms_L, the engine rotational speed signal n as well as the fuel signal m_K and which ascertains a calculated measure ms_NOx_vK_mod of the untreated NOx current before the SCR catalytic converter ms_NOx_vK as well as a reagent substance pilot signal ms_Rea_VS.

The control unit 20 further contains a NOx current ascertainment 32, which is provided with the calculated measure ms_NOx_vK_mod for the untreated NOx current before the SCR catalytic converter ms_NOx_vK as well as a degree of efficiency eta_Kat of the SCR catalytic converter 16, and which ascertains a calculated measure ms_NOx_nK_mod for the NOx current ms_NOx_nK downstream after the SCR catalytic converter 16. The degree of efficiency eta_Kat of the SCR catalytic converter 16 is provided by a catalytic converter efficiency model 60, which is provided with the measure for the temperature T_Kat of the SCR catalytic converter 16, a space velocity RG as well as a reagent substance actual fill level Rea_Sp_Ist in the SCR catalytic converter 16.

The calculated measure ms_NOx_nK_mod for the NOx current ms_NOx_nK and the exhaust gas sensor signal S_nK are provided to a first difference ascertainment 33, which ascertains a difference D. The difference D is provided to a metering correction device 34, which provides a metering alteration signal E, which is supplied to a first summing amplifier 35.

The first summing amplifier 35 ascertains a modified reagent substance actual fill level Rea_Sp_Ist from the metering alteration signal E and the reagent substance actual fill level Rea_Sp_Ist. The modified reagent substance actual fill level Rea_Sp_Ist is made available to a second difference ascertainment 36, which ascertains a control deviation 37 from the modified reagent substance actual fill level Rea_Sp_Ist and a reagent substance set point fill level Rea_Sp_Soll.

A closed-loop controller 38 ascertains a regulating variable 39 from the control deviation 37. This regulating variable 39 is provided to a second summing amplifier 40, which adds a reagent substance pilot signal ms_Rea_VS to the regulating variable 39 and which provides the reagent substance signal ms_Rea. The reagent substance signal ms_Rea is made available to a catalytic converter model 42, which supplies the reagent substance actual fill level Rea_Sp_Ist.

The reagent substance signal ms_Rea is provided to a first integrator 50, which supplies a metered reagent substance quantity M_Rea, which is made available to a third summing amplifier 51. The third summing amplifier 51 adds a reagent substance fill level alteration D_Rea_Sp to the metered reagent substance quantity M_Rea. The reagent substance fill level alteration D_Rea_Sp is ascertained from a reagent substance fill level model 52 as a function of the measure for the temperature T_Kat of the SCR catalytic converter 16 and as a function of the reagent substance actual fill level Rea_Sp. The third summing amplifier 51 relays a modified metered reagent substance quantity M_Rea to a correction signal ascertainment 53, which makes a correction signal K available, which is provided to the metering correction device 34.

The correction signal ascertainment 43 is provided additionally with a converted NOx quantity D_NOx, which a second integrator 54 ascertains from the converted NOx dms_NOx, which a NOx conversion ascertainment 55 ascertains from the calculated measure ms_NOx_vK_mod for the untreated N Ox current before the SCR catalytic converter ms_NOx_vK as well as from the calculated measure ms_NOx_nK_mod for the calculated NOx current after the SCR catalytic converter ms_NOx_nK.

Both integrators 50, 54 and the reagent substance fill level model 52 are acted upon by a time signal, which specifies a time period ti and a waiting period tw. A time emitter 56 makes the time signal available.

The procedure according to the invention works as follows:

The torque ascertainment 30 disposed in the control unit 20 ascertains the torque Md generated by the internal combustion engine 10 as a function of at least the specified torque set point MFa, which, for example, is provided by an unspecified accelerator pedal of a motor vehicle, in which the internal combustion engine 10 is disposed as the power source. The torque Md is at least approximately a measure for the load of the internal combustion engine 10. When ascertaining the torque Md, the engine rotational speed signal n and/or the air signal ms_L supplied by the air acquisition 12 can continue to be taken into account.

The control unit 20 transmits the fuel signal m_K, which is established especially on the basis of the torque, to the fuel metering device 25. The fuel signal m_K establishes, for example, a fuel point of injection as well as an injected quantity of fuel. The fuel combusted in the internal combustion engine 10 leads to the exhaust gas flow ms_abg, which can contain the undesirable, more or less large, untreated NOx current before the SCR catalytic converter ms_NOx_vK as a function of the operating point of the internal combustion engine 10. The term untreated NOx current before the SCR catalytic converter ms_NOx_vK means, for example, a NOx mass flow or a NOx volume flow or a NOx particle flow or a NOx concentration.

At least the SCR catalytic converter 16 is disposed in the exhaust gas region 13 of the internal combustion engine 10 for the most extensive as possible removal of the untreated NOx current before the SCR catalytic converter ms_NOx_vK. Beside the SCR catalytic converter 16, provision can be made for additional catalytic converters and/or a particle filter. The SCR catalytic converter 16 supports the reducing reaction of the NOx with a reagent substance, which is either metered into the exhaust gas region 13 with the reagent substance metering 14 and/or if need be is supplied within the motor. Provision can be made for a source material instead of the reagent substance. In the case of the reagent substance ammonia, provision can be made, for example, for a urea-water solution or, for example, for ammonium carbamate to be the source material. The dosage is established with the reagent substance signal ms_Rea, which is provided to the reagent substance metering 14. Alternatively or additionally, when the reagent substance is supplied by the engine internally, the fuel signal m_K can be modified by the reagent substance signal ms_Rea in such a way that the required amount of reagent substance is generated internally.

After starting the procedure according to the invention, the establishment of the reagent substance set point fill level ReaSp_Soll occurs at the specified reagent substance fill level Rea_Sp_Soll, which, for example, can be established at a value, which lies under the maximum possible reagent substance fill level in the SCR catalytic converter 16 if a reagent substance slip ms_Rea_nK is to be avoided if possible in all operating states. Provision is made in contrast in an advantageous embodiment for the specified reagent substance set point fill level Rea_Sp_Soll to correspond at least to the maximum possible reagent substance fill level in the SCR catalytic converter 16, which is dependent on the temperature T_Kat in the SCR catalytic converter 16. The correlation is described in detail in the German patent DE 10 2004 031 624 A1 mentioned at the beginning of the application, which is hereby referred to in its entirety. If a difference D occurs, it can be assumed in this case that the difference reflects with a high degree of probability a reagent substance slip ms_Rea_nK; so that initial reaction can be a reduction of the dosage.

The reagent substance actual fill level Rea_Sp_Ist in the SCR catalytic converter 16 can be set to a specified reagent substance actual fill level Rea_Sp_Soll using a closed-loop control. Provision is preferably made for a closed-loop control to a specified reagent substance fill level Rea_Sp_Soll. In the second difference ascertainment 36 the reagent substance set point fill level Rea_Sp_Soll is compared with the modified reagent substance actual fill level Rea_Sp_Ist. The second difference ascertainment 36 constructs a difference, which is delivered as a control deviation 37 to the closed-loop controller 38, which ascertains the control variable 39 from the control deviation 37. In the second summing amplifier 40, the control variable 39 is added to the preferably existing reagent substance pilot signal ms_Rea_VS, which the untreated NOx ascertainment 31 supplies.

The reagent substance pilot variable ms_Rea_VS specifies a base quantity of the reagent substance to be metered as a function of, for example, the engine rotational speed n and the torque Md of the internal combustion engine 10. This procedural approach allows for a comparatively easy application.

The regulating variable 39, which if necessary is combined with the reagent substance pilot variable ms_Rea_VS, establishes the reagent substance signal ms_Rea, which is fed to the reagent substance metering 15 and/or the fuel metering device 25. The reagent substance signal ms_Rea enables, for example, a cross section of a valve to open, which corresponds to a specified reagent substance flow, which additionally depends on the reagent substance pressure.

The catalytic converter model 42 ascertains the reagent substance actual fill level Rea_Sp_Ist using the reagent substance signal ms_Rea while taking into account the untreated NOx current before the SCR catalytic converter ms_NOx_vK as well as additional variables, as, for example, the NOx current after the SCR catalytic converter ms_NOx_nK as well as the measure for the temperature T_Kat of the SCR catalytic converter 16. The reagent substance slip ms_Rea_nK is if need be additionally taken into account. The catalytic converter model 42 is described in the aforementioned State of the Art, to which reference is again made at this point.

Provision is made to ascertain the calculated measure ms_NOx_nK_mod for the NOx current after the SCR catalytic converter ms_NOx_nK. The calculation takes place in the NOx current ascertainment 32 on the basis of the calculated measure ms_NOx_vK_mod for the untreated NOx current before the SCR catalytic converter ms_NOx_vK, which the untreated NOx concentration ascertainment 31 supplies on the basis of, for example, the torque Md and/or the engine rotational speed signal n. The ascertainment results on the basis of the degree of efficiency eta_Kat of the SCR catalytic converter 16, which the catalytic converter degree of efficiency model 60 calculates on the basis of the measure for the temperature T_Kat, which the temperature sensor 17 makes available, which can be disposed upstream before, within or downstream after the SCR catalytic converter 16; so that the sensor signal provided by the temperature sensor 17 is at least approximately a measure for the temperature T_Kat of the SCR catalytic converter 16. Provision can also be made for an estimation of the temperature T_Kat of the SCR catalytic converter 16 instead of a temperature measurement.

Preferably the exhaust gas space velocity RG is additionally taken into account in the catalytic converter degree of efficiency model 60. The exhaust gas space velocity RG can be ascertained from the known geometric data of the SCR catalytic converter 16 and from the exhaust gas flow ms_abg. Additionally, the reagent substance actual fill level Rea_Sp_Ist in the SCR catalytic converter 16 is taken into account because the degree of efficiency also especially depends on the reagent substance actual fill level Rea_Sp_Ist.

The measure ms_NOx_nK_mod calculated by the NOx current ascertainment 32 for the NOx current after the SCR catalytic converter ms_NOx_nK is subtracted from the exhaust gas sensor signal S_nK in order to obtain the difference D. A difference D, which occurs, can be taken into account in the metering strategy, and the reagent substance signal ms_Rea can be influenced accordingly.

When the metering alteration signal E is being supplied, the correction signal K, which the correction signal ascertainment 53 provides, continues to be taken into account in the metering correction device 34 along with the difference D.

The metering alteration signal E could immediately be used to influence the reagent substance signal ms_Rea. In the example of embodiment depicted, the reagent substance signal ms_Rea is indirectly influenced by way of an intervention into the reagent substance actual fill level Rea_Sp_Ist, whereby the metering alteration signal E manipulates the reagent substance actual fill level Rea_Sp_Ist in the SCR catalytic converter 16. The reagent substance actual fill level Rea_Sp_Ist calculated from the catalytic converter model 42 is acted upon by the metering alteration signal E, so that subsequently only the modified reagent substance actual fill level Rea_Sp_Ist is taken into account. Provided that a difference D occurs, an increase in the modified reagent substance actual fill level Rea_Sp_Ist, for example, results, which due to the closed-loop control has a reduction of the reagent substance signal ms_Rea as a consequence.

It is possible in principle to acquire the NOx current ms_NOx_nK after the SCR catalytic converter with a NOx sensor and to acquire the reagent substance slip ms_Rea_nk with a reagent substance sensor. The utilization of an existing lateral sensibility of the second NOx sensor 18 to the reagent substance is, however, particularly advantageous or a targeted development of such a lateral sensibility. In this case, the exhaust gas sensor signal S_nK reflects the sum of the reagent substance slip ms_Rea_nK and the NOx current after the SCR catalytic converter ms_NOx_nK. A difference D, which occurs, could mean for that reason that either a reagent substance slip ms_Rea_nK or a large NOx current after the SCR catalytic converter ms_NOx_nK has occurred. Discrimination between the two would not be possible.

Provision is therefore made in the procedure according to the invention for a plausibility check, which checks to see if the alteration of the dosage with the metering alteration signal E has taken place in the right direction. Provision is made for a comparison of the metered reagent substance quantity M_Rea and the reagent substance quantity converted in the SCR catalytic converter 16, which is identical with the converted NOx quantity D_NOx except for a conversion factor. In the following the converted NOx quantity D_NOx is examined, which the second integrator 54 makes available from the converted NOx dms_NOx based on an integration. The converted NOx dms_NOx is ascertained from the NOx coversion ascertainment 55 using the calculated measure ms_NOx_vK for the untreated NOx current before the SCR catalytic converter ms_NOx_vK and the calculated measure ms_NOx_nK_mod for the NOx current after the SCR catalytic converter ms_NOx_nK.

The metered reagent substance quantity M_Rea is ascertained by the second integrator 50 from the reagent substance signal ms_Rea using integration.

Because the reagent substance actual fill level Rea_Sp_Ist in the SCR catalytic converter 16 is dependent on the temperature T_Kat of the SCR catalytic converter 16; according to an advantageous embodiment, a reagent substance fill level alteration D_Rea_Sp, which occurs if need be during the integration, is taken into account for the metered reagent substance quantity M_Rea. The reagent substance fill level alteration D_Rea_Sp provides the reagent substance fill level model 52 using at least the temperature T_Kat of the SCR catalytic converter and the existing reagent substance actual fill level Rea_Sp_Ist according to the stated procedural approach according to the State of the Art, which is once again expressly referred to at this point.

The third summing amplifier 51 adds the reagent substance fill level alteration D_Rea_Sp, which can be either positive or negative, to the metered reagent substance quantity M_Rea and makes available the modified, metered reagent substance quantity M_Rea, which is compared with the converted reagent substance quantity, respectively the converted NOx quantity. As a function of the comparison, the correction signal K is made available, which influences the reagent substance signal ms_Rea via the metering alteration signal E.

In order to be independent of the metered reagent substance quantity M_Rea as an absolute value, an ascertainment can be made in the correction signal ascertainment 53, for example, from the converted reagent substance quantity, respectively the converted NOx quantity D_NOx, less the metered reagent substance quantity M_Rea, additionally less the reagent substance fill level alteration D_Rea_Sp, whereby the difference formed is subsequently divided by the metered reagent substance quantity M_Rea. If the result, for example, is greater than a specified threshold value, a false adaptation can be recognized so that the correction signal K can be emitted corresponding to an increase or reduction of the dosage of the reagent substance.

The chronological open-loop control results with the time emitter 56, which transmits the time period ti and the waiting period to both integrators 50, 54 as well as to the reagent substance fill level model 52. The time period ti establishes, for example, an integration time of the integrators 50, 54. Furthermore, the time period ti establishes the time for the ascertainment of the reagent substance fill level alteration D_Rea_Sp in the reagent substance fill level model 52. Additionally provision is made with the time period to set all of the components in periodic intervals back to a starting state. After making the correction signal K available in the course of a required intervention into the metering with the correction signal K, it can be expedient to block the plausibility check for the waiting period tw, which is likewise predefined by the time emitter 56 and which can be established on the basis of an application. This is done in order to achieve at least a quasi-stationary operating state, which is as stable as possible after the alteration of the dosage of the reagent substance.

After the predefined time period ti of the time emitter 56 has run out, the procedural approach according to the invention makes an examination possible by means of the plausibility check to see whether an underdosage or an overdosage of the reagent substance existed. Provided this is the case, an intervention is made with the correction signal K, and the reagent substance signal ms_Rea is influenced into the correct direction. For this reason the procedural approach according to the invention makes possible for an optimal conversion of the untreated NOx current before the SCR catalytic converter ms_NOx_vK and assures simultaneously a minimal reagent substance slip.

The invention claimed is:

1. A method of operating an internal combustion engine having an exhaust gas section with at least one SCR catalytic converter whose NOx conversion efficiency is regulated with a reagent substance, the method comprising:
    calculating a first NOx current occurring downstream after the SCR catalytic converter;
    measuring a second NOx current occurring downstream after the SCR catalytic converter with a NOx sensor, wherein the NOx sensor has a lateral sensitivity to the reagent substance;
    determining a difference between the first NOx current and the second NOx current;
    generating a reagent substance signal that establishes a dosage of the reagent substance, wherein the reagent substance signal is a function of the difference between the first NOx current and the second NOx current;
    providing the established dosage of the reagent substance to the SCR catalytic converter: and
    performing a plausibility check wherein a correction signal, which influences the reagent substance signal, is generated upon deviation of a comparison of a reagent substance quantity metered in a predefined time period with a reagent quantity converted in the SCR catalytic converter and a NOx quantity.

2. A method according to claim 1, wherein a change in a reagent substance actual fill level in the SCR catalytic converter is monitored during the predefined time period occurring during the predefined time period occurring during the plausibility check.

3. A method according to claim 2, wherein a temperature of the SCR catalytic converter is considered when a change of the reagent substance actual fill level is ascertained.

4. A method according to claim 1, further comprising conducting a standardization to the reagent substance quantity metered in the predefined time period when the correction signal is ascertained.

5. A method according to claim 1, wherein the reagent substance signal is established as a function of the reagent substance actual fill level in the SCR catalytic converter.

6. A method according to claim 5, wherein the reagent substance actual fill level in the SCR catalytic converter is set to a predefined reagent substance set point fill level in a closed-loop control.

7. A method according to claim 5, wherein the reagent substance signal is influenced indirectly by way of a manipulation of the reagent substance actual fill level in the SCR catalytic converter.

8. A method according to claim 1, wherein an additional plausibility check is conducted only following termination of a predefined waiting period after the reagent substance signal has been influenced by the correction signal.

9. A device for operating an internal combustion engine comprising at least one control unit programmed to implement a method of operating an internal combustion engine having an exhaust gas section with at least one SCR catalytic converter whose NOx conversion efficiency is regulated with a reagent substance; the method including calculating a NOx current occurring downstream after the SCR catalytic convert; measuring a NOx current occurring downstream after the SCR catalytic converter with a NOx sensor, wherein the NOx sensor has a lateral sensitivity to the reagent substance; calculating a difference between the calculated NOx current and the measured NOx current; generating a reagent substance signal which establishes the dosage of the reagent substance, wherein the reagent substance signal is a function of the difference between the calculated NOx current and the measured NOx current; providing the established dosage of the reagent substance to the SCR catalytic converter; and performing a plausibility check wherein a correction signal, which influences the reagent substance signal, is generated upon deviation of a comparison of a reagent substance quantity metered in a predefined time period with a reagent quantity converted in the SCR catalytic converter and a NOx quantity.

10. A device according to claim 9, wherein the control unit contains a correction signal ascertainment which makes the correction signal available and a first integrator to ascertain the metered reagent substance quantity and a second integrator to ascertain the reagent substance quantity converted in the SCR catalytic converter or a converted NOx quantity.

* * * * *